(12) United States Patent
Frischkorn et al.

(10) Patent No.: US 6,971,662 B2
(45) Date of Patent: Dec. 6, 2005

(54) TOWING DEVICE FOR VEHICLES

(75) Inventors: Harald Frischkorn, Homberg (DE); Gunther Hartmann, Alsfeld (DE); Wolfgang Sommer, Gemünden (DE); Frank Wagner, Grossen Buseck (DE)

(73) Assignee: KAMAX-Werke Rudolf Kellerman GmbH & Co. KG, Osterode am Harz (DE)

( * ) Notice: Subject to any disclaimer, the term of this patent is extended or adjusted under 35 U.S.C. 154(b) by 0 days.

(21) Appl. No.: 10/680,764

(22) Filed: Oct. 7, 2003

(65) Prior Publication Data

US 2004/0070173 A1    Apr. 15, 2004

(30) Foreign Application Priority Data

Oct. 10, 2002   (DE) ................ 102 47 377

(51) Int. Cl.[7] ............................................. B60D 1/01
(52) U.S. Cl. ................... 280/491.5; 280/491.1
(58) Field of Search ................ 280/480, 488, 280/491.1, 491.5, 495, 497, 499, 515

(56) References Cited

U.S. PATENT DOCUMENTS 2,760,789 A * 8/1956 Wampler ............... 280/494
3,801,134 A * 4/1974 Dees .................... 280/416.1
4,374,593 A * 2/1983 Smith et al. ........... 280/491.5
6,158,760 A * 12/2000 Kiss .................... 280/491.5
2003/0201622 A1 * 10/2003 Westerdale ............ 280/495

FOREIGN PATENT DOCUMENTS

| DE | 4409290 A1 | 9/1995 | ........... B60D 1/14 |
| DE | 19933652 A1 | 1/2001 | ........... B60D 1/14 |
| DE | 10153032 A1 | 7/2002 | ........... B60D 1/14 |
| JP | 11334329 | 12/1999 | ........... B60D 1/04 |
| JP | 2000296742 | 10/2000 | ........... B60R 19/48 |
| WO | WO 01/81106 A1 | 11/2001 | ........... B60D 1/06 |
| WO | WO 03/051654 A1 | 6/2003 | ........... B60D 1/14 |

* cited by examiner

*Primary Examiner*—Tony Winner
(74) *Attorney, Agent, or Firm*—Thomas, Kayden, Horstemeyer & Risley, LLP

(57) ABSTRACT

A towing device (1) for motor vehicles includes an elongated element (2) having a length, a cross section, a first end portion (13) and a second end portion (5). The cross section of the elongated element (2) at least along a part of the length of the elongated element (2) is designed to be hollow. The first end portion (13) is designed to be connected to a motor vehicle. The towing device (1) further includes a lug (3) being connected to the second end portion (5) of the elongated element (2). Due to the hollow cross section, the mass of the towing device (1) is substantially reduced.

14 Claims, 8 Drawing Sheets

TOWING DEVICE FOR VEHICLES

CROSS REFERENCE TO RELATED APPLICATIONS

This application claims priority to co-pending German Patent Application No. 102 47 377 entitled "Abschleppöse für ein Kraftfahrzeug", filed Oct. 10, 2002.

FIELD OF THE INVENTION

The present invention generally relates to a towing device for vehicles. More particularly, the present invention relates to a towing device for motor vehicles including an elongated element and a lug to be used at a motor vehicle to be towed or to tow in combination with other towing means, such as a towing rope or a tow-rod.

Such towing devices are contained in the motor vehicle in their demounted state, and they are connected either to the front or to the rear of the motor vehicle, especially by a screw connection. In many cases, the towing device includes an outer thread to be screwed into a corresponding inner thread of a nut element being arranged at a carrying part of the motor vehicle, for example a longitudinal carrier or a transverse carrier of the motor vehicle.

BACKGROUND OF THE INVENTION

A towing device is known from German Patent Application No. DE 199 33 652 A1 corresponding to U.S. Pat. No. 6,382,654 B1 and from German Patent Application No. DE 44 09 290 A1. The known towing devices include an elongated element being formed as a rod having a full cross section. The known towing device is designed as one piece. At its one end, the known towing device includes a threaded portion. At its other free end, the elongated element is deformed to form a lug. Usually, such towing devices are made of metal. Consequently, they are often designed as forge parts, the lug being formed by a forging process, while the threaded portion is produced in another separate step.

Another towing device is generally known. The known towing device is designed as a one-piece forge part. The elongated element includes a full cross section being designed similar to a four-leaved clover or star to reduce the mass of the known towing device. Such forge elements are comparatively complicated and expensive.

SUMMARY OF THE INVENTION

The present invention relates to a towing device for motor vehicles. The towing device includes an elongated element having a length, a cross section, a first end portion and a second end portion. The cross section of the elongated element at least along a part of the length of the elongated element is designed to be hollow. The first end portion is designed to be connected to a motor vehicle. The towing further device includes a lug being connected to the second end portion of the elongated element.

The present invention also relates to a towing device including a rod element and a lug. The rod element has a length, a cross section and an end portion. The cross section of the rod element at least along a substantial part of the length of the rod element is designed to be hollow. The lug is connected to the end portion of the rod element.

Usually, the towing device is contained in the trunk of a motor vehicle, and it is designed to be connected to a carrying part either at the front or at the rear of the motor vehicle in case the motor vehicle needs to be towed or it is desired to tow another vehicle with the motor vehicle. The carrying part is located at some distance with respect to the outermost parts of the motor vehicle, especially the bumper. The towing device has a corresponding length to span this distance and to be capable of connecting a towing rope, a tow-rod and the like to the lug of the towing device. The term lug is to be understood as to also include similar elements such as eye hooks, eyelets, loops and other hook-like element.

The lug serves for connection to a tow means, especially a towing rope to be connected between a pulling vehicle and the vehicle to be towed. Due to the fact that two vehicles being interconnected in this way also have to move through curves, the towing device is not only subjected to pulling forces, but also to bending forces. Consequently, the comparatively long elongated element of the towing device may be subjected to substantial bending moments. This is the reason why it is preferred that the towing device is designed as a metal form element having a shape which is comparatively stiff to bending.

The elongated element or rod element of the novel towing device is partly or completely designed as a hollow body, meaning a body having a hollow cross section. Such a hollow cross section has an advantageously low weight and great stiffness to bending since the material is arranged at a respective distance about the axis of the elongated element. The hollow cross section may start at one end of the elongated element. For example, it may be produced by cupping or dishing. This means that the material is dislocated from the center of the elongated element to move towards the open end and the outer portions of the elongated element without being removed. Consequently, the mass of the elongated element after cupping will remain the same, but the length will be increased. Compared to a known elongated element having a full cross section and the same length, the mass and the weight, respectively, of the novel elongated element is reduced.

Alternatively or additionally, the hollow cross section may also begin at the other end of the elongated element. The hollow cross section may extend in a continuous way along the entire length of the elongated element, as it is the case in a tube section. To achieve bending stiffness in all directions transverse to the axis of the elongated element, it is preferred to use an annular cross section. Such a design allows for introducing the towing device into a corresponding circular opening being located in a part of the bumper and, for example, to additionally support the towing device at the bumper. The hollow cross section of the elongated element may also be used for connection to a bolt including a threaded portion and/or for connection to a lug. In this way, there is the possibility of producing the lug from a bent section of wire. It is to be understood that the elongated element and the lug are especially produced from corresponding metals which may be connected by welding, especially by resistance welding.

The lug may be made of a bent wire portion the ends of which are fixedly connected to the elongated element, especially by a welding connection. The lug may also be designed as a forge part. The permanent non-rotational connection between the lug and the elongated element may also be realized by crimping, by inserting a transverse pin, and the like. Depending on where the hollow cross section portion of the elongated element is located, the ends of the bent wire portion are connected to the outside or to the inside of the elongated element by welding. There also is the possibility of arranging recesses, punches, and the like in the wall of the elongated element, and to permanently connect the ends of the wire portion to these configurations.

It is especially preferred if the elongated element at least in its end portion facing the lug includes the hollow cross section. In such a case, the two ends of the wire portion forming the lug may be introduced into the hollow cross section of the elongated element, and they may be fixedly connected therewith by welding, for example. The two ends of the lug are then located in the inside of the elongated element such that there are no outwardly protruding edges and the like which could cause injuries.

The elongated element at its end facing away from the lug may include a threaded portion, the elongated element in its end portion facing away from the threaded portion being designed to be cupped. It is especially advantageous if the elongated element and the threaded portion are made of one piece, meaning the threaded portion is directly located at the elongated portion. The elongated element and the threaded portion are then made of one section of material, for example a wire portion in the form of a blank. Shaping of the elongated element and the threaded portion preferably is achieved by deformation without producing chips. This may be realized by cupping the diameter of the blank in its one end portion, and by rolling an outer thread onto the other end portion. Due to cupping, the material of the blank is deformed without producing chips. Some parts of the material are dislocated onto an increased diameter with respect to the axis of the middle portion. This is advantageous with respect to the stiff design of the towing device (strain-hardening effects), and it simplifies arrangement of two ends of the lug inside of the cup to be connected therewith by welding. Such a cup may have a substantial length, for example of a plurality of centimeters. The cup may extend along at least approximately 30% of the total axial length of the elongated element, preferably at least approximately 50%, more preferably at least approximately 70%. Consequently, the cup substantially reduces the mass of the elongated element compared to an elongated element not including a hollow cross section. It is also possible to arrange the threaded portion at a third component of the novel towing device, for example a bolt, and to connect the bolt to the elongated element.

It is especially advantageous if the hollow cross section of the middle portion of the elongated element is designed to be annular. In this way, great degrees of deformation may be attained, and the elongated element has the same stiffness against bending in all directions.

The towing device may also be designed to include three components. In this case, the threaded portion may be located at a bolt. The elongated element and the bolt are fixedly interconnected, especially by welding. The connection of the lug and the elongated element does not depend on the connection of the elongated element and the bolt. Alternatively, both welding connections may be produced at the same time such that one attains the novel towing device including three interconnected elements at a time. In this case, it is especially advantageous if the elongated element is made of a tube section. This means that it has a hollow cross section along its entire axial length. Such tube sections forming the elongated element preferably are produced by cutting a tube into sections. There is the additional advantage of being capable of producing towing devices for different motor vehicles requiring different lengths depending on the length of the tube section.

Alternatively, the elongated element may also be designed as a form part being cupped at both ends for introduction of the lug at one end, and of the bolt including a threaded portion at the other end.

The elongated element may also be designed as a section of a hollow extruded profile having a stiff cross section. Such a cross section does not necessarily have to be annular. It is also possible to use cross sections being similar to a rectangular tube, an oval tube, and the like. It is also possible that the elongated element at its side to be connected with the lug includes two cups, the two cups being arranged such that they form a hollow, stepped cross section (for example, see FIGS. 18 and 19).

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
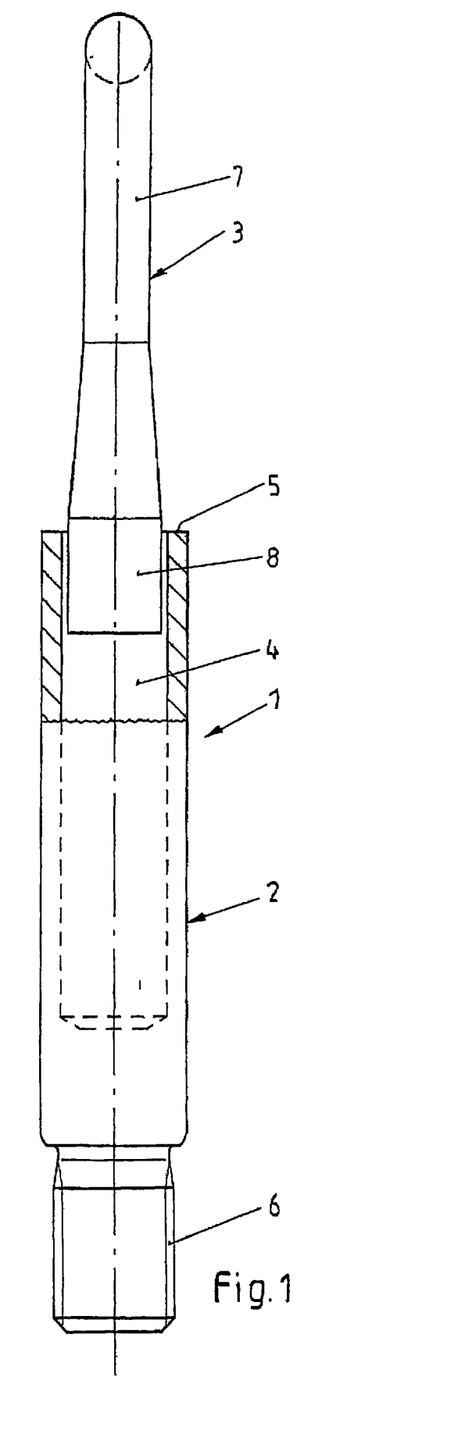
FIG. 1 is a partly sectional view of a first exemplary embodiment of the novel towing device.

Referring now in greater detail to the drawings, FIG. 1 illustrates an exemplary embodiment of a novel towing device 1. The towing device 1 as illustrated in FIG. 1 includes a total number of two components. However, the towing device 1 may also include more than two components. The first component is an elongated element 2. The second component is designed as a lug 3. The elongated element 2 has an elongated shape similar to a pin, a rod or a stick. It may have a length of approximately 10 cm to 20 cm. The length may be chosen in coordination with the size of parts of the car body, especially the bumper. Preferably, the elongated element 2 is made of metal, especially weldable steel. It is designed to be capable of bearing pulling forces, pressing forces and bending forces. The elongated element 2 is designed to be hollow along a substantial portion of its axial extension. Preferably, the elongated element 2 is designed to be hollow along the majority of its axial extension. The elongated element 2 has a hollow cross section 4. In the illustrated embodiment of the novel towing device 1 as illustrated in FIG. 1, the hollow cross section 4 is realized by cupping. The cup begins at the first end 5 of the elongated element 2 facing the lug 3, and it extends along a certain length towards the other end. The hollow design of the elongated element 2 results in a substantial relative reduction of the mass in combination with great resistance properties against bending. These properties are especially desired in parts used in the automobile industry. The elongated element 2 at its end facing away from the lug 3 includes a threaded portion 6 including an outer thread being coordinated with an inner thread being located at the primary structure of the motor vehicle to be connected to the towing device 1. Consequently, the towing device 1 with its threaded portion 6 is designed to be screwed into a coordinated hole including an inner thread being located in a motor vehicle. Such conventional inner threads being located in a motor vehicle are generally known in the art, and they therefore do not need to be described in greater detail herein. The threaded portion 6 may be produced by rolling the blank later forming the elongated element 2.

Figure 2:
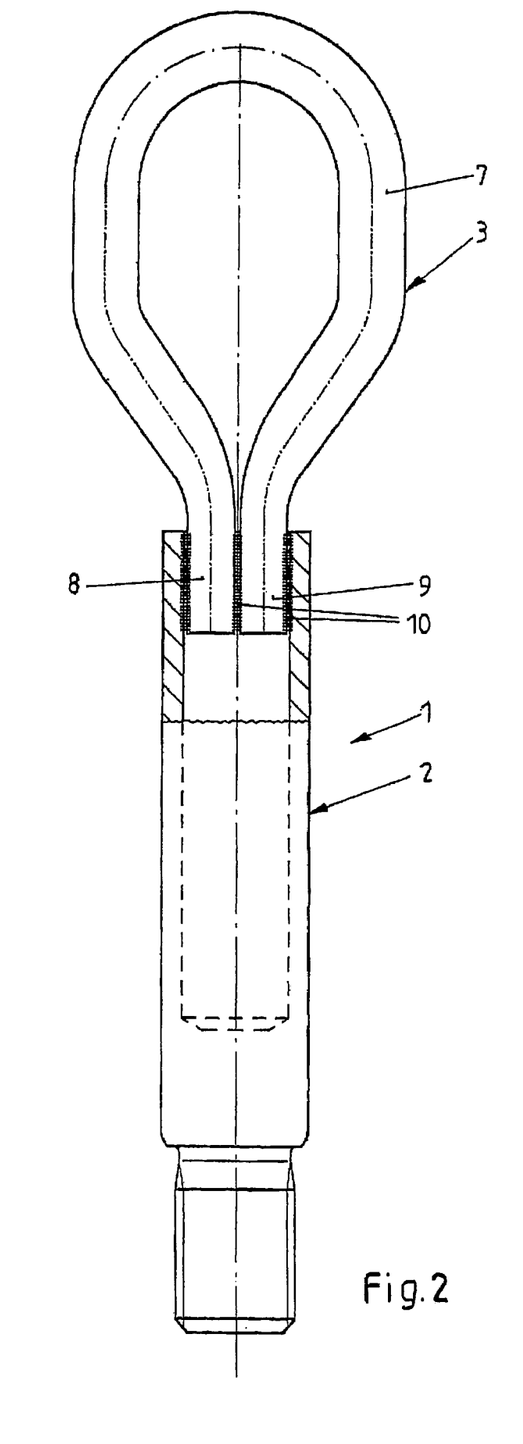
FIG. 2 is a view of the novel towing device according to FIG. 1 in a position rotated by 90° compared to FIG. 1.

As illustrated in FIGS. 1 and 2, the lug 3 may be made of a bent wire portion 7 the ends 8 and 9 of which are designed to be flattened such that the common circumference of the ends 8 and 9 approximately has a circular shape. In this way, the two ends 8 and 9 may be introduced into the hollow cross section of the elongated element 2 (see FIG. 1). The ends 8 and 9 are fixedly, preferably non-detachably, connected to the elongated element 2 to form a stiff unit. For example, this connection may be realized by welding connections 10. For this purpose, the lug 3 and the wire portion 7, respectively, is made of weldable material. For example, the welding connections 10 may be produced by resistance welding.

Figure 3:
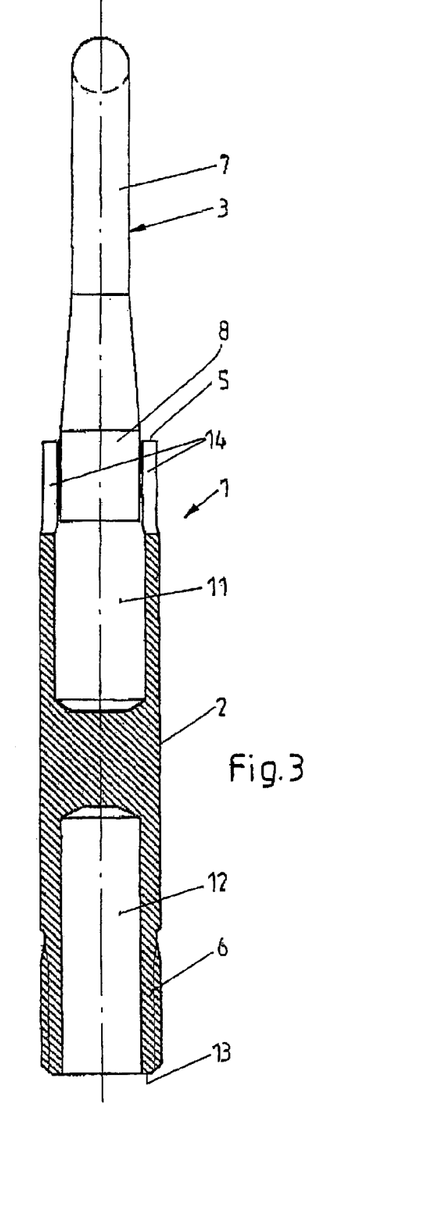
FIG. 3 is a view of a second exemplary embodiment of the novel towing device with the elongated element being illustrated in a sectional view.
Figure 4:
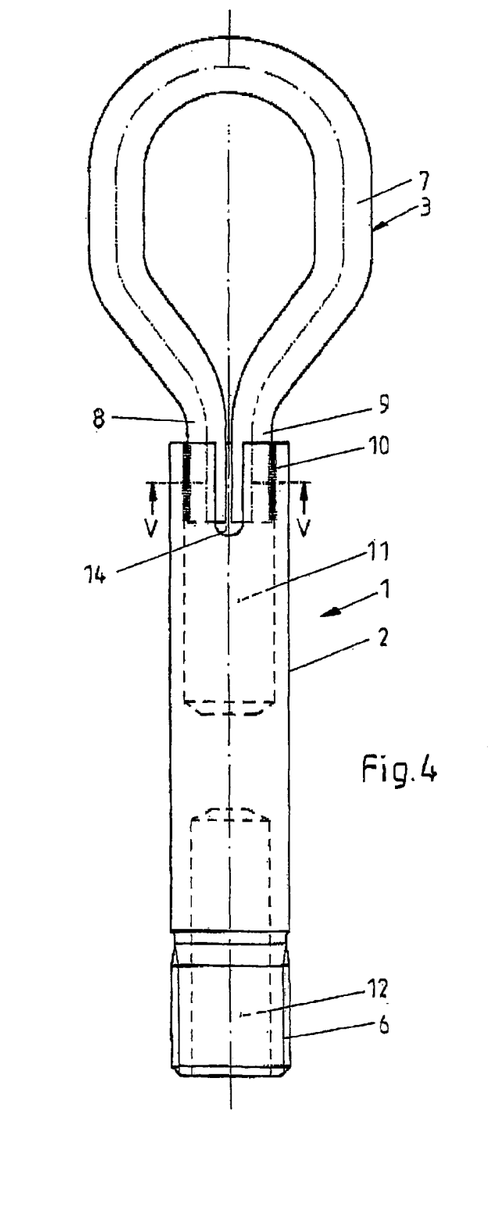
FIG. 4 is a view of the towing device according to FIG. 3 in a position rotated about 90° compared to FIG. 3.
Figure 5:
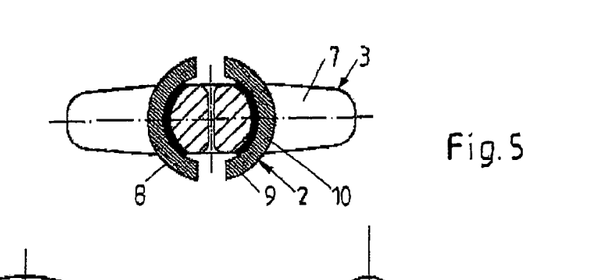
FIG. 5 is a sectional view along line V—V in FIG. 4.

FIGS. 3 to 5 illustrate another exemplary embodiment of the novel two-part towing device 1. In this case, the elongated element 2 is designed to be cupped at both sides to further reduce the mass and the weight, respectively, of the towing device 1. This means that a first cup 11 starts at the end 5, and a second cup 12 starts at the end 13 in a way that they protrude into the elongated element 2. The threaded portion 6 begins in the region of the second end 13. Due to the fact that the axial extension of the cups to be formed in the blank of the elongated element 2 in an axial direction is limited by production technique, t he arrangement of the two cups 11 and 12 allows for the possibility of substantially reducing the mass even when the elongated element 2 has a substantial axial length.

Punchings 14 approximately having a U-formed shaped (see FIG. 4) may be located at the end of the elongated element 2 facing the lug 3. Due to these punchings 14, the end 5 of the elongated element 2 facing the lug 3 is designed to be more elastic. This somewhat elastic design has a positive influence on the possibility of producing the welding connections 10. The special cross section of the two ends 8 and 9 of the wire portion 7 is also illustrated in FIG. 5. Alternatively and/or additionally, the punchings 14 may also be used to produce a welding connection in this region.

Figure 6:
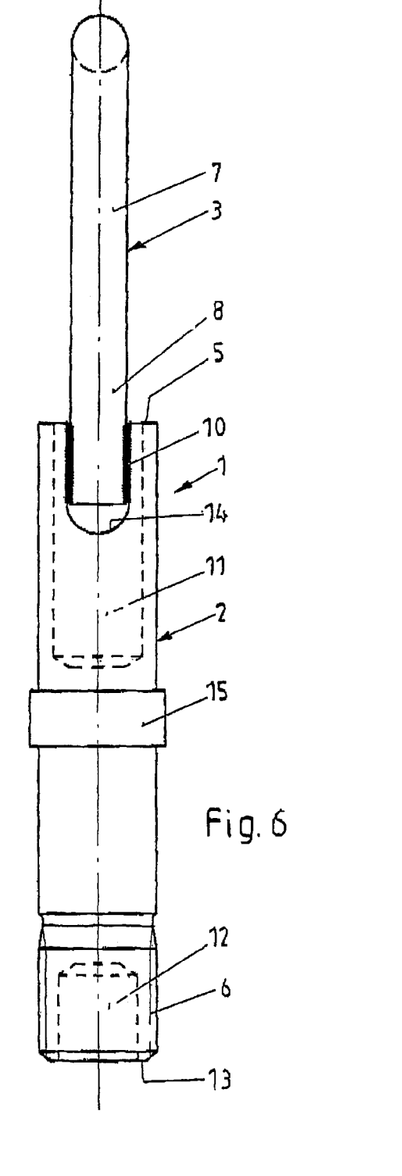
FIG. 6 is a view of a third exemplary embodiment of the novel towing device.
Figure 7:
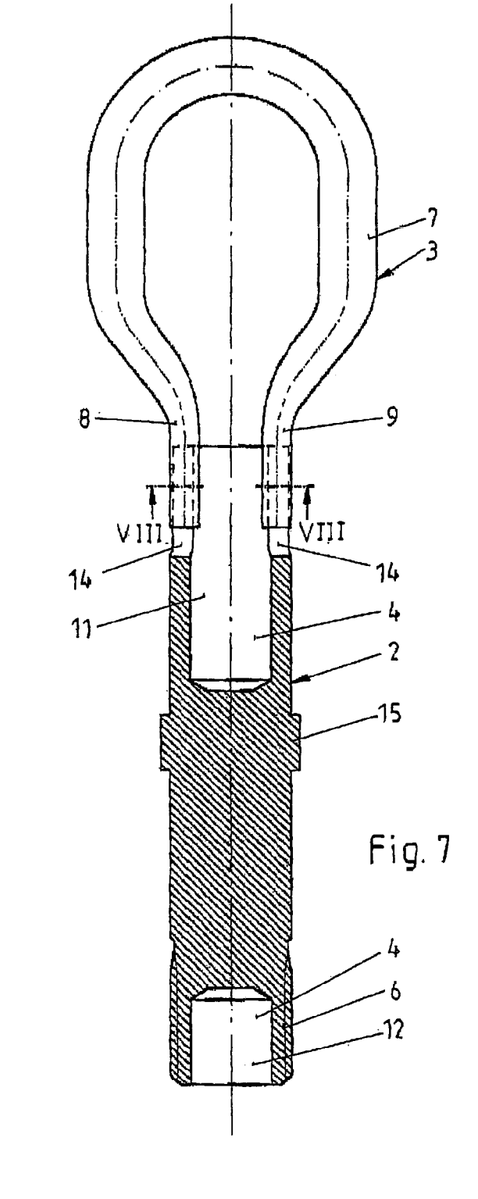
FIG. 7 is a view of the towing device according to FIG. 3 in a position rotated about 90° compared to FIG. 6.
Figure 8:
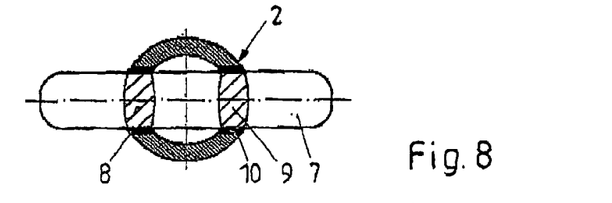
FIG. 8 is a sectional view along line VIII—VIII in FIG. 7.

FIGS. 6 to 8 illustrate another exemplary embodiment of a two-part towing device 1. Again, the elongated element 2 includes the two cups 11 and 12. The cup 12 is designed to be slightly shorter in an axial direction, and it extends within the axial extension of the threaded portion 6. The elongated element 2 includes a protruding center collar 15 which may be used to support the towing device 1 at a protruding portion of the vehicle when the towing device 1 is subjected to bending forces. The punchings 14 are designed to be slightly wider. The ends 8 and 9 of the lug 3 have been deformed to have a cross section as illustrated in FIG. 8. Furthermore, the ends 8 and 9 are arranged at such a distance with respect to one another that the ends 8 and 9 may be introduced into the punchings 14 to be permanently connected to the elongated element 2 by welding connections 10. In this exemplary embodiment of the novel towing device 1, the ends 8 and 9 of the lug 3 also do not include portions extending in a radial outward direction about the circumference of the elongated element 2.

Figure 9:
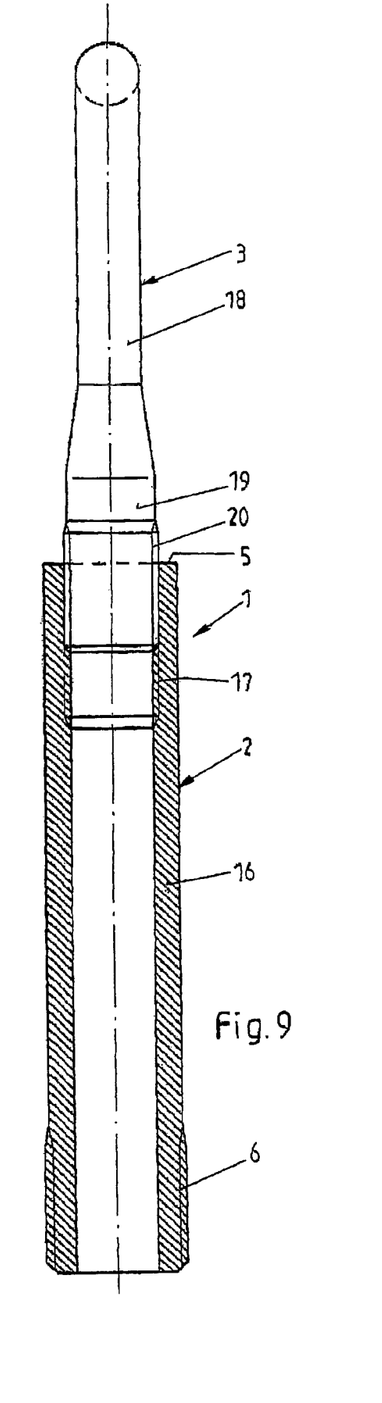
FIG. 9 is a view of another exemplary embodiment of the novel towing device with the elongated element being illustrated in a sectional view.
Figure 10:
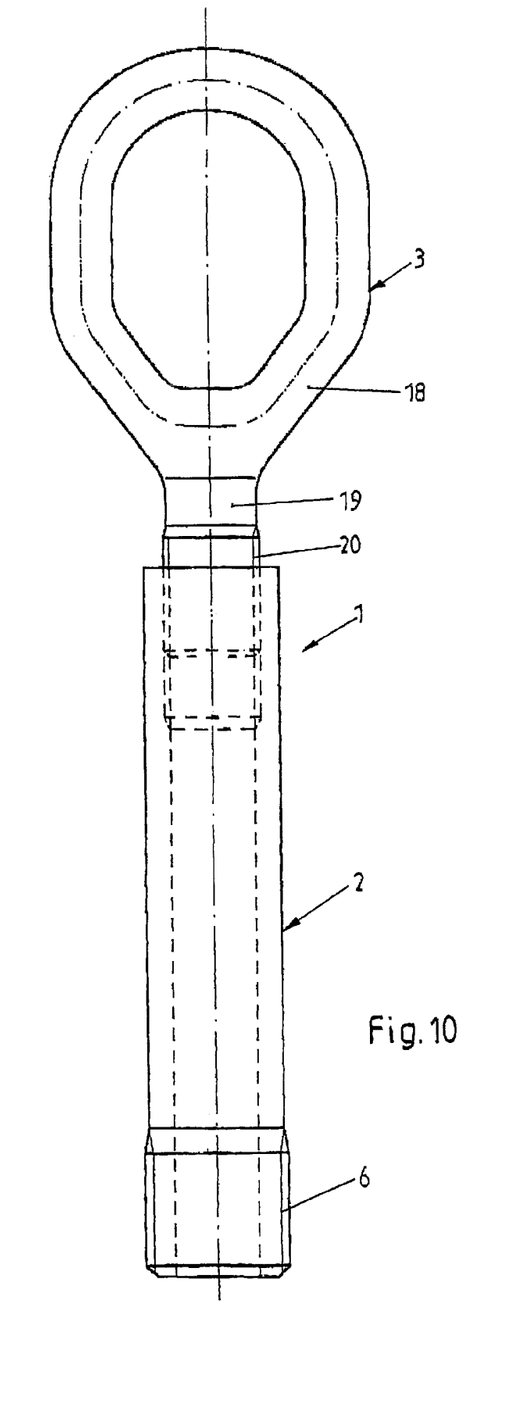
FIG. 10 is a view of the towing device according to FIG. 3 in a position rotated about 90° compared to FIG. 9.

FIGS. 9 and 10 illustrate another exemplary embodiment of the novel two-part towing device 1. A tube section 16 serves as a blank for producing the elongated element 2. The tube section 16 includes an inner threaded portion 17 beginning at its end 5. The lug 3 is designed as a forging part 18, and it includes an outer thread 20 being located at a protrusion 19 facing away from the elongated element 2. The angle of inclination (helix angle) of the inner thread 17 differs from the angle of inclination of the outer thread 20 to realize a fixed connection secured against rotation when screwing the lug 3 into the elongated element 2. The use of a tube section 16 as a blank for the elongated element 2 is especially advantageous with respect to the production cost. It is to be understood that such a tube section 16 may also be used in combination with the other embodiments of the towing device 1 as described herein.

Figure 11:
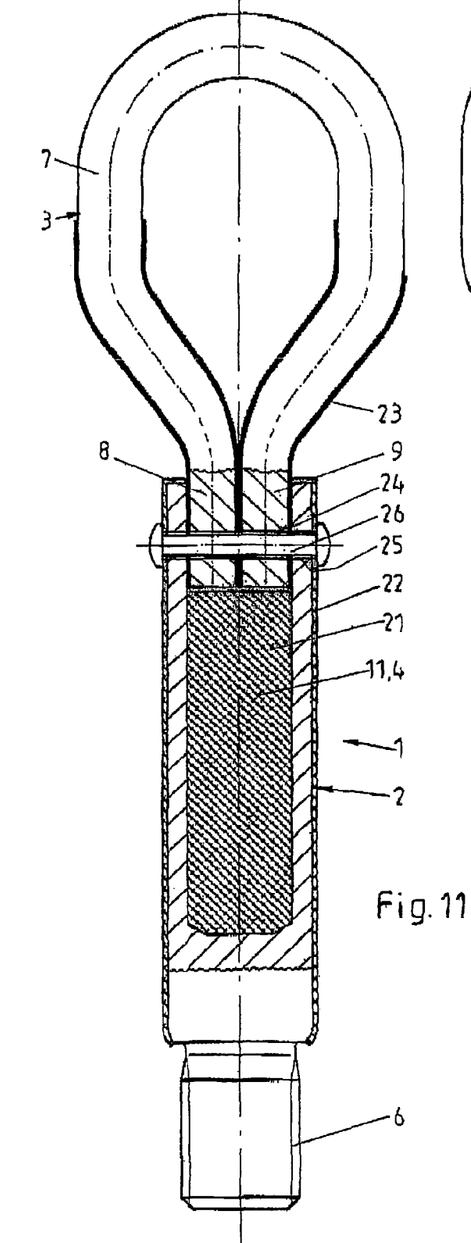
FIG. 11 is a view of another exemplary embodiment of the novel towing device.

FIG. 11 illustrates another exemplary embodiment of the novel towing device 1 the elongated element 2 of which only includes one cup 11. The cup 11 is mostly filled with plastic foam 21, for example a polyurethane foam having advantageous corrosion preventing properties. The elongated element 2 may also include an outer cover 22 made of plastic material, a protecting coating or enameling and the like. The ends 8 and 9 of the lug 3 may be mostly covered with a coating 23 also having corrosion preventing properties. The cross sections of the ends 8 and 9 have a design similar to the one illustrated in FIG. 5. In addition, the two ends 8 and 9 include an aligned opening 24. Corresponding openings 25 are located in the wall of the elongated element 2 having the hollow cross section 4 in an aligned and coordinated way such that the connection may be realized by a transverse pin 26, a rivet and the like. In case protruding rivet heads are not desired in the special case of application, it is also possible to use a comparatively shorter bolt to be pressed into the openings with a press fit.

Figure 12:
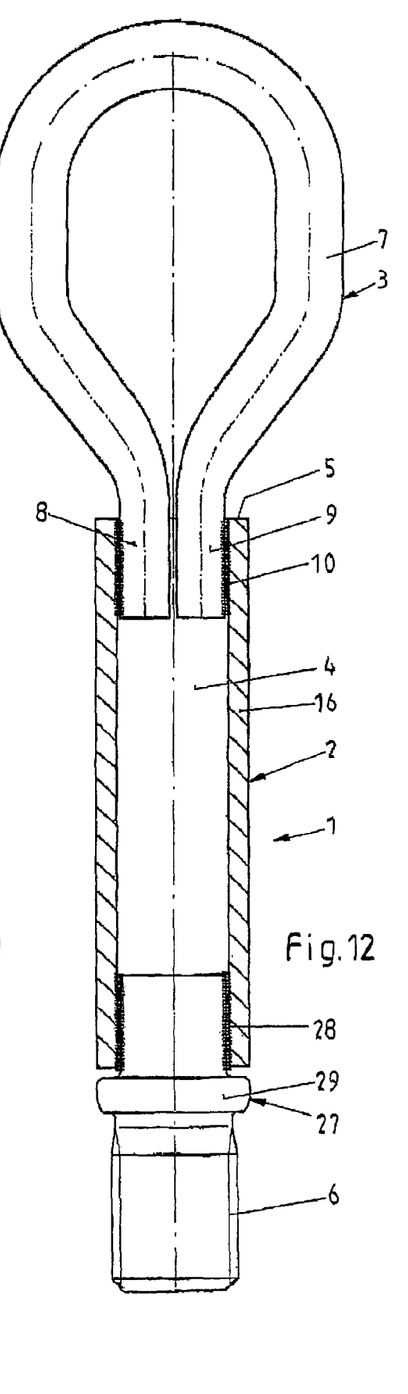
FIG. 12 is a view of another exemplary embodiment of the novel towing device including three elements.

FIG. 12 illustrates another exemplary embodiment of the novel towing device 1. In this case, the towing device 1 is designed to include three components. The towing device 1 includes the elongated element 2 being made of a tube section 16, the lug 3 and a bolt 27. The lug 3 is fixedly connected to the tube section 16 by welding connections 10 such that they cannot be rotated with respect to one another. The bolt 27 carrying the threaded portion 6 is fixedly and permanently connected to the elongated element 2 by a welding connection 28 such that they cannot be rotated with respect to one another. A swelling 29 may be arranged at the bolt 27 to limit the inserting movement of the bolt 27 into the tube section 16 before producing the welding connection 28.

Figures 13, 14:
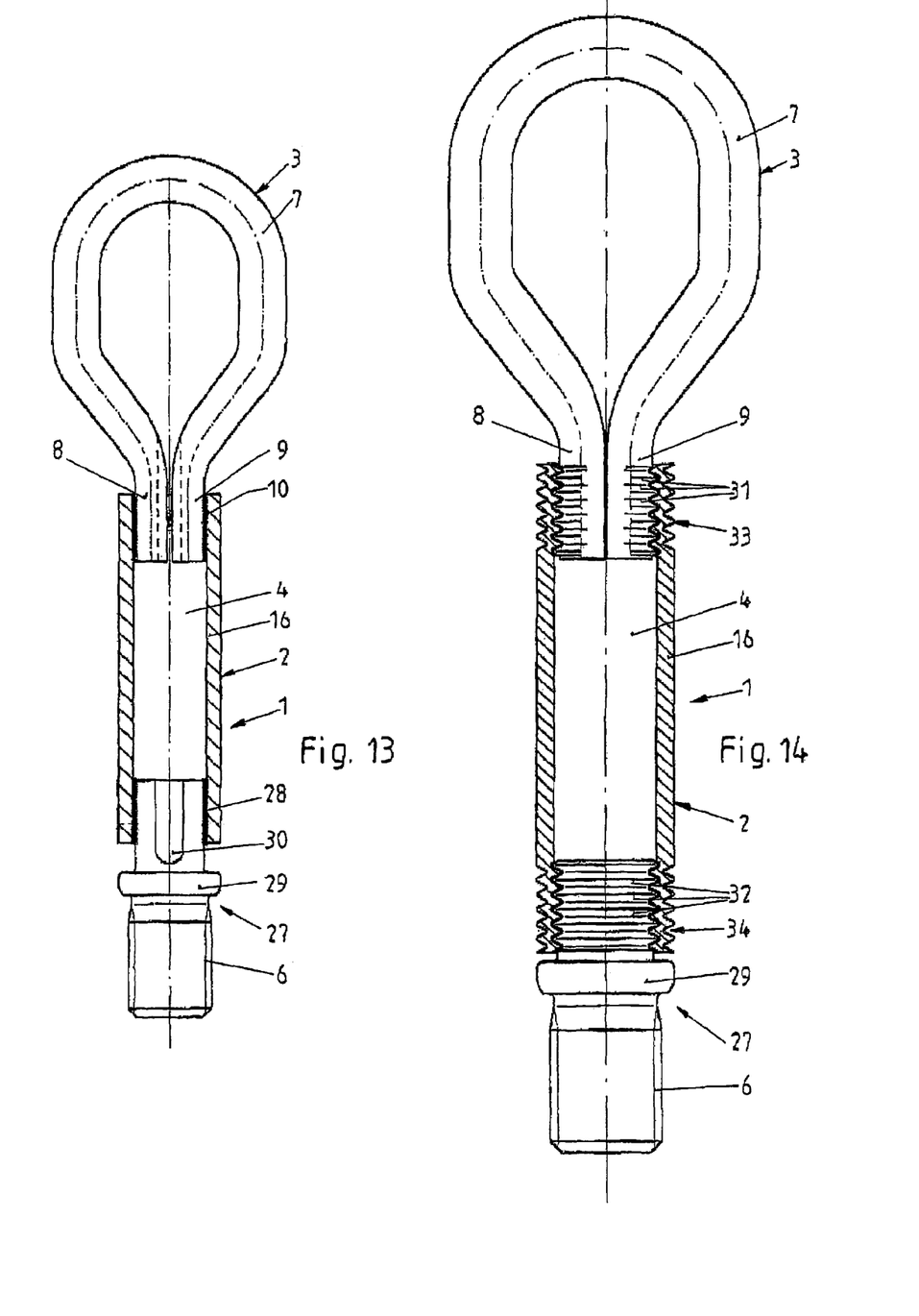
FIG. 13 is a view of another exemplary embodiment of the novel towing device including three elements.
FIG. 14 is a view of another exemplary embodiment of the novel towing device including three elements being interconnected by crimping connections.

FIG. 13 illustrates another exemplary embodiment of the novel towing device 1. Again, the towing device 1 is designed to include three main components, these three components being mostly similar to the ones described with respect to the embodiment of the towing device 1 illustrated in FIG. 12. In addition, the bolt 21 in its connection portion to the tube section 16 includes flattenings 30 such that the bolt 27 has a respective elongated cross section and the welding connections 28 do not extend along the entire circumference of the bolt 27, but rather at two opposed locations. The flattenings 30 further ensure that the hollow chamber 4 is deaerated. This especially makes sense when applying a plating cover, for example.

FIG. 14 illustrates another exemplary embodiment of the novel three-part towing device 1 including the elongated element 2 being made of a tube section 16 having a continuous hollow cross section 4. The ends 8 and 9 of the lug 3 are designed to have approximately semicircular cross sections facing one another such that at least a portion of the circumference forms a surface including undercuts and impressions. This design may be realized by surrounding ribs 31. The corresponding part of the bolt 27 may also include such ribs 32 or, for example, a coarse thread and the like. Crimp connections 33 and 34 serve to interconnect the three elements in a permanent way not to be rotatable with respect to one another. It is also possible to use a crimp connection at the two connecting locations with the tube section 16 having an outer surface being smooth and having a reduced diameter.

Figure 15:
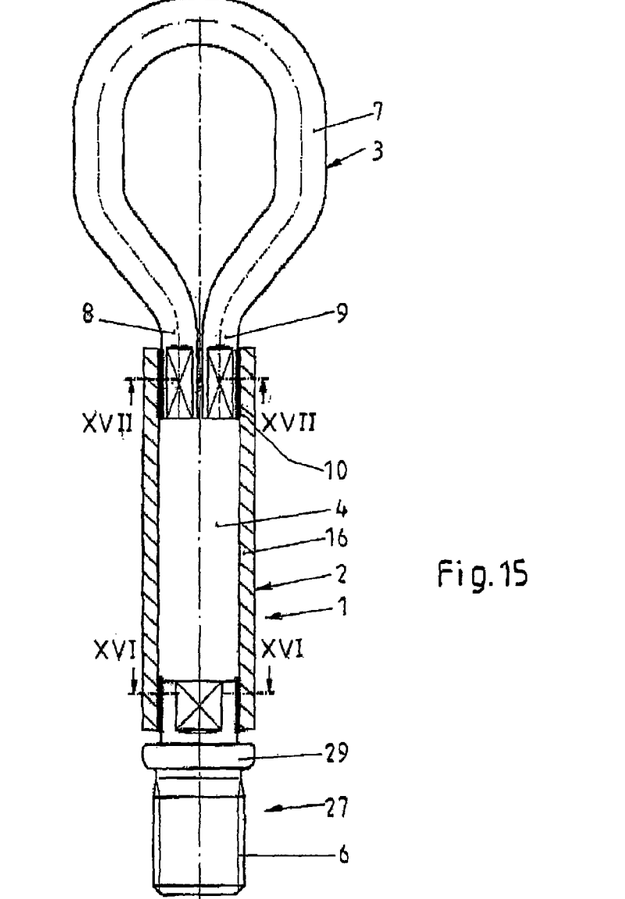
FIG. 15 is a view of another exemplary embodiment of the novel towing device including three elements, the elongated element having a rectangular cross section.
Figure 16:
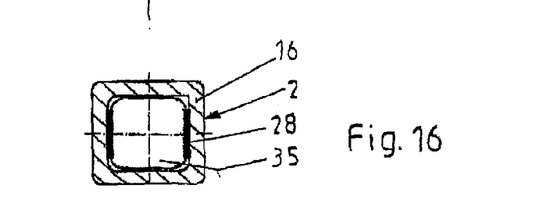
FIG. 16 is a sectional view along line XVI—XVI in FIG. 15.
Figure 17:
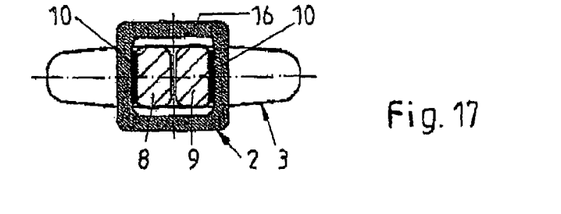
FIG. 17 is a sectional view along line XVII—XVII in FIG. 15.

The exemplary embodiment of the novel towing device 1 illustrated in FIGS. 15 to 17 also has a three-part design. The tube section 16 has a cross section of a square tube (FIG. 16). The bolt 27 in its end portion facing away from the threaded portion 6 has a rounded, square cross section 35 by which the bolt 27 is welded to the tube section 16. The two ends 8 and 9 of the lug 3 also have a cross section being coordinated with the cross section of the tube section 16 (see FIG. 17). This cross section allows for easy appliance of welding connections 10 when permanently connecting the lug 3 and the elongated element 2.

Figures 18, 19:
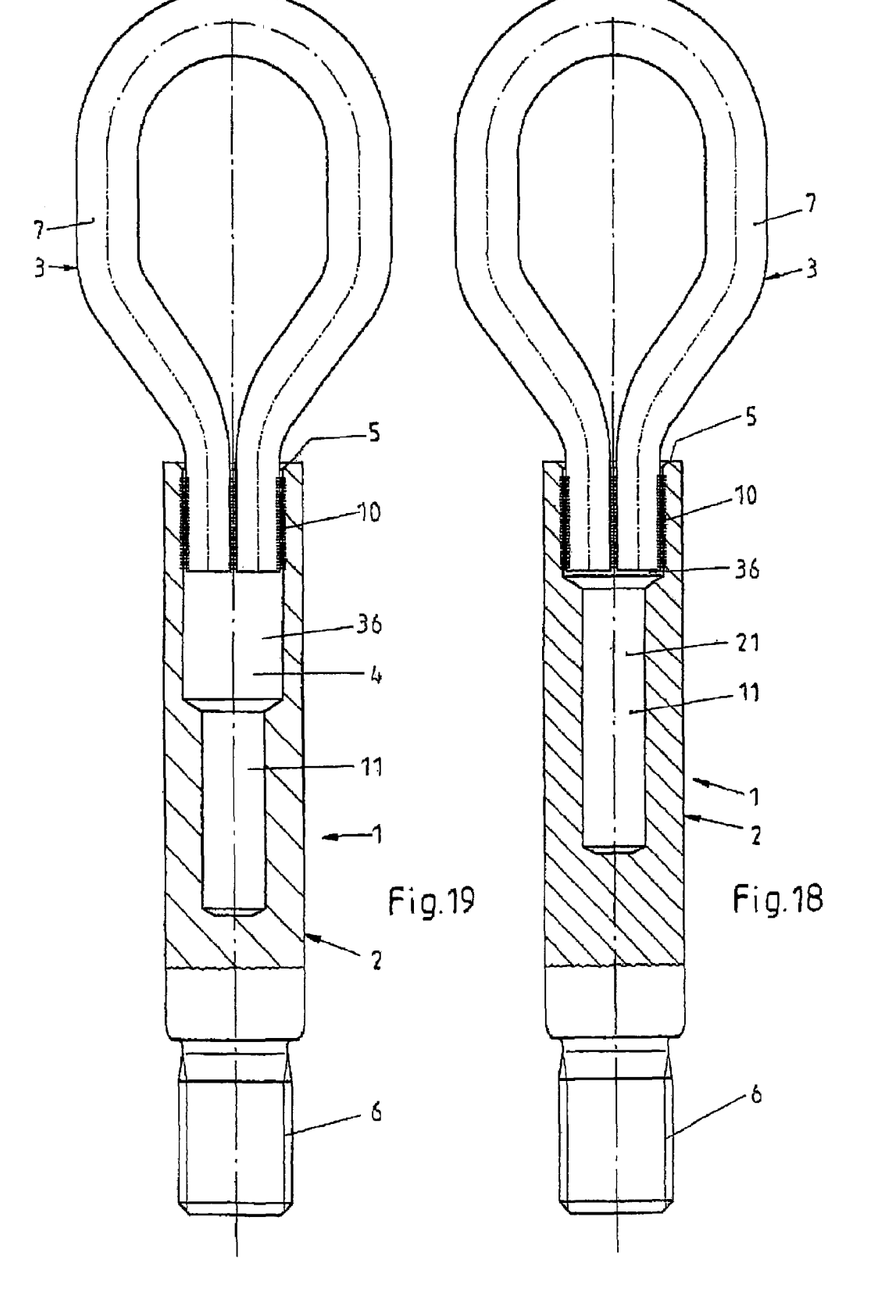
FIG. 18 is a view of another exemplary embodiment of the novel towing device including a double cup arrangement.
FIG. 19 is a view of another exemplary embodiment of the novel towing device including a double cup arrangement.

FIGS. 18 and 19 illustrate two further exemplary embodiments of the novel towing device 1 each including two components. Both elongated elements 2 are designed to include a cup from one side. However, they both include two cups, the first cup 11 being formed in a first step, and a second cup 36 having a comparatively greater diameter being formed from the same side 5 in a second step. This "double cup design" is advantageous with respect to production technique, and it makes it possible that the material of the blank for the elongated element 2 flows especially far in an axial direction. This means that the elongated element 2 attains an especially great axial length at a low weight. The aspect ratio between the cups 11 and 36 may be varied, as it may be seen from a comparison of FIGS. 18 and 19. The permanent connection between the elongated element 2 and the lug 3 is also realized by the welding connections 10.

FIGS. 1 to 18 illustrate a great number of details of exemplary embodiments of the novel towing device 1 being designed as to include two components or three components. The three-part design includes a place of connection between the lug 3 and the elongated element 2 and a place of connection between the elongated element 2 and the bolt 27. However, it is to be understood that the above described ways of connecting and designing the components of the novel towing device 1 may also be combined in a way as it is understood from a combination of FIGS. 1 to 19.

Many variations and modifications may be made to the preferred embodiments of the invention without departing substantially from the spirit and principles of the invention. All such modifications and variations are intended to be included herein within the scope of the present invention, as defined by the following claims.

We claim:

1. A towing device for motor vehicles, comprising:
    an elongated element having a length, a cross section, a first end portion and a second end portion,
        the cross section of said elongated element at least along a part of the length of said elongated element being designed to be hollow, and
        the first end portion including a threaded portion to be connected to a motor vehicle; and
    a lug, said lug being connected to the second end portion of said elongated element, said lug being made of a bent wire portion having two ends, the ends of said bent wire portion being fixedly connected to the second end portion of said elongated element.

2. The towing device of claim 1, wherein the ends of said bent wire portion are fixedly connected to said elongated element by a welding connection.

3. The towing device of claim 2, wherein said elongated element at its second end portion is designed to include a cup.

4. The towing device of claim 1, wherein said elongated element at its second end portion is designed to include a cup.

5. The towing device of claim 1, wherein said hollow cross section of said elongated element is designed to be annular.

6. The towing device of claim 1, further comprising a bolt, said bolt being fixedly connected to the first end portion of said elongated element and including a threaded portion to be connected to a motor vehicle.

7. The towing device of claim 6, wherein said bolt and said elongated element are interconnected by a welding connection.

8. The towing device of claim 1, wherein said elongated element is made of a tube section.

9. The towing device of claim 1, wherein said elongated element at both end portions includes a cup.

10. The towing device of claim 1, wherein said elongated element is made of a section of a hollow profile tube having a cross section which is stiff to bending.

11. The towing device of claim 1, wherein said elongated element at its first end portion includes a first cup and a second cup.

12. The towing device of claim 1, wherein the hollow cross section of said elongated element is formed by a cup extending from the second end portion of said elongated element towards the inside of said elongated element in an axial direction.

13. The towing device of claim 12, wherein said cup is filled with plastic foam.

14. The towing device of claim 13, wherein said plastic foam is polyurethane foam having corrosion preventing properties.

* * * * *